United States Patent Office 3,046,084
Patented July 24, 1962

3,046,084
GLASS SURFACE TREATMENTS
Folsom Munro Veazie, Granville, Ohio, assignor to Owens-Corning Fiberglas Corporation, a corporation of Delaware
No Drawing. Filed Dec. 13, 1960, Ser. No. 75,478
8 Claims. (Cl. 18—54)

The present invention relates to methods and materials for treating glass structures and particularly to treating methods and materials which facilitate the melting of glass structures employed as base materials in the fabrication of glass fibers.

Glass structures such as marbles, cullet, beads, rods and the like have gained widespread acceptance as base materials for the production of fibrous glass, primarily because of the homogeneity of glass composition throughout the structures, handleability, storage characteristics and controlled uniformity achieved with such structures as opposed to the utilization of batch compositions wherein fibers are drawn from a molten mass obtained by fusing together glass batch materials such as silica, soda ash and lime. A spherical structure termed a marble and having the general shape and size of the marbles employed in children's games, has achieved particular popularity as a base material in fiberizing processes due to its uniform structural and melting characteristics and its suitability for storage, shipping and feeding to the melting apparatus.

In preparing glass fibers, the glass structures which provide the base material are fed into a heated bushing which is provided with orifices, and are transformed into a molten state whereby the molten glass may be continuously flowed through the orifices and attenuated into continuous vitreous filaments or fibers. The fibers thus formed are immediately wound upon apparatus positioned adjacent to the fiber-forming bushing, to provide a wound package.

However, the utilization of glass structures as the base materials which are rendered molten and attenuated into fibers is attended by the formation of "stones" and "seeds." Stones appear as crystals entrained within the otherwise amorphous glass, while seeds are small bubbles which may stem from gases given off when stones or crystals are redissolved in the amorphous glass.

Such persistent formation of stones and seeds has raised a serious hindrance to the utilization of glass structures as base materials in fiberizing, since their presence results in the plugging of the orifices of the fiber-forming bushing and in the frequent breaking of the fibers during attenuation. These processing detriments occur despite the small size of stones and seeds, due to the fact that the diameters of the fibers and bushing orifices range in the area of .0002 to .008 inch.

While the production stoppage and necessity for refurbishing which results from the plugging of bushing orifices by stones and seeds are major processing detriments, the problem of fiber breakage has much graver implications. In studies aimed at remedying the fiber breaking problem, it has been observed that fiber breaks occurring during attenuation and winding, normally occur at areas containing an entrained stone or seed and a resultant heterogeneous and weakened region. The magnitude of this problem is aptly demonstrated by the fact that in the formation of wound packages of fibrous glass strand, only from 4 to 60% of the packages begun are completed, as a result of fiber breaks. A tremendous amount of waste is thus reflected in the discarding of the product, since the packages are discarded if the interruption occurs within two minutes from the commencement of the forming cycle. In any event, a production loss is entailed in such interruptions.

The higher attrition rate of only 4% uninterrupted completions, with an average uninterrupted completion of only 15 to 20% of the packages begun, occurs in the case of high through-put bushings wherein fibers are drawn at a fast rate. The high incidence of breaking occurring during rapid attenuation is apparently the result of the relatively short residence time of the marbles or glass structures in the heated bushing, since this time averages one-half hour or less in such bushings as compared to six hours in slower fiber-forming bushings. While an obvious solution to such a problem appears to lie in the advancement of bushing temperatures or the provision of larger bushings with an attendant increase in the residence time of the marbles in the bushing, such remedies are in fact impractical and not economically feasible. Due to the high temperatures and abrasive or erosive chaarcteristics of the molten glass, highly specialized materials containing costly substances such as platinum are employed in the fabrication of the bushing. The characteristics of such materials serve to restrict the bushing temperatures which may be employed. The costliness of such materials as well as the necessity for increased floor space and heating allotments, combine to prevent the adoption of an expedient wherein larger bushings are employed to provide a corresponding increase in melt residency.

At any rate, it is apparent that the formation and occurrence of stones and seeds in fiberizing processes which employ glass structures as base materials, pose a current problem which results in large losses in the form of product waste, processing delay, work stoppage and bushing refurbishing, for which a solution has not been provided.

It is an object of this invention to provide a method for the deletion or curtailment of harmful stone and seed formation in the preparation of glass fibers from a molten mass obtained by melting glass structures.

A further object is the provision of a method for improving the performance and facilitating the melting of glass structures employed as base materials in fiberizing processes.

Another object is the provision of treated glass structures which demonstrate improved performance characteristics in the preparation of glass fibers.

An additional object is the provision of treated glass structures possessing enhanced devitrification characteristics and increased production values when employed as base materials in the fabrication of glass fibers.

Still another object is the provision of surface treating materials for the surfaces of glass structures employed in the fabrication of glass fibers.

The aforegoing objects are achieved by the invention by treating the surfaces of the glass structures with an acidic medium. The treatment is achieved by contacting the surfaces of the glass structures with an acid by means of conventional immersion, contact or spray techniques. The structures are then withdrawn from contact with the acid and may be dried by contrived heat, or through standing or may be used immediately in a fiberizing process.

The process for the treatment of the glass structures is graphically illustrated by the following flow diagram:

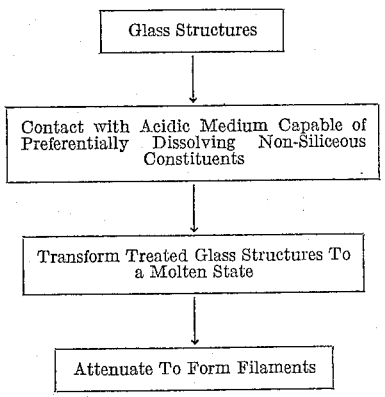

By means of the methods and materials of the invention, the melting of the treated glass structures and the conduct of the fiber-forming operation is greatly improved due to the diminution or substantial deletion of stone and seed formation. As a result, both fiber breaks and bushing build-up or clogging are greatly diminished with attendant time, processing and product improvements.

While the theory or theories underlying the efficacy of the methods and materials of the invention have not been completely developed, a number of highly plausible propositions are advanced.

In one theory, surface devitrification is purported to comprise the culpable factor in the instigation of stone and seed formation. In this regard, it is believed that devitrification or crystal formation at the surface of the glass structure results in the formation of a heterogeneous structure having a crystal containing surface and an amorphous core or central portion. This condition may be increased by the presence of devitrification upon the surface of the structure prior to melting and the tendency of such crystals to enhance or facilitate further crystal formation as the structure passes through the devitrification temperature range, prior to attaining liquidus temperature. The effect may be further amplified by the tendency among glasses, with rare exceptions such as the opal glasses, to experience the onset of devitrification or crystallization at the surface of the structure. Presumably, carrying the treating temperature beyond the devitrification range and to the point of liquidus should result in the resolution of crystals formed during devitrification. However, the apparent validity of this premise is somewhat changed when one considers the treatment of a heterogeneous structure. In such case, the physical characteristics of the devitrified or crystalline surface of the structure, which differ from the characteristics of the amorphous core of the structure, may result in a condition wherein the amorphous material of the core attains liquidus prior to the devitrified surface and the latter fails to attain liquidus throughout the course of the heat treatment. It is feasible that while a temperature above the liquidus temperature is attained, the rate of resolution of the crystals is so low that complete resolution is not accomplished during the period of residence within the heated bushing. This may account for the fact that the problem of stone and seed formation is pronounced in high through-put bushings. Accordingly, deleterious substances are entrained in the molten glass either in the form of crystalline stones or as bubbles or seeds produced by gases evolved by the stones. In view of the extremely small diameters of the glass fibers formed from such a melt, even a small incidence of such formations may prove exceedingly harmful.

It is further suspected that the troublesome stones comprise diopside, wollastonite, trydimite and cristobalite with trydimite, wollastonite and cristobalite acting as the worst offenders due to the fact that diopside contains natural fluxing materials which facilitate its resolution.

If this analysis of the cause of seed and stone formation is correct, it is possible that the acid treatments of the invention serve to remove crystalline and crystal forming materials from the surface of the glass structure, to leave a silica network which is substantially free of harmful crystallization characteristics during the fiberizing process.

A second theory postulates that the acid treatment may serve to draw cations such as calcium, magnesium and aluminum to the marble surface where they serve as fluxing materials and consequently aid in the resolution of crystalline materials.

At any rate, the curtailment of stone and seed formation and the fiberization of glass structures treated according to the invention is aptly demonstrated by the production values achieved when such treated structures are employed in the formation of glass fibers.

Inorganic acids generally, such as nitric, hydrochloric, sulfuric, hydrofluoric and sulfamic acid as well as the comparatively strong organic acids such as acetic, formic or oxalic acid may be employed in the conduct of the invention. All of these acids will serve to dissolve preferentially the non-siliceous constituents at the surfaces of the glass structures and to provide a surface which essentially comprises a porous or discontinuous silica network. While the acid may be selected primarily for its leaching effect upon glass, secondary considerations such as the rapidity of the leaching may also be taken into consideration in the selection of the acid. Another factor may be the tendency of the acid utilized to deposit salts which are not dispelled by the bushing temperature, and serve to create another type of stone in the glass fibers. For example, nitric acid is preferable to sulfuric since the nitrates are decomposed by the bushing heat while the sulfates may survive to become entrained in the fibers. Still another factor in the selection of the acid is the susceptibility of the particular glass composition to be treated, to the leaching effect of the acid. For example, lead borate glasses are particularly susceptible to leaching by means of nitric and hydrochloric acid.

The acid concentration of the treating bath or material is also not critical and may be varied within reasonable limits with longer treatments necessitated by lower concentrations. In a preferred treatment, it has been found that a thirty second immersion of spherical glass structures having a diameter of less than one inch in a nitric acid bath having a pH of 3.0–3.3, is adequate to provide treated structures exhibiting greatly improved fiber-forming characteristics.

A preferred treatment is expressed by the following example.

Example

A quantity of spherical glass structures having a diameter of approximately 13/16 of one inch were immersed for a thirty second period in a nitric acid bath having a pH of between 3.0 and 3.3. The marbles were air dried after withdrawal from the bath and were subsequently fed into a fiber-forming bushing where they were melted and attenuated to form a plurality of glass fibers.

While a simple immersion method in which the glass structures are submerged in the treating bath is preferred, other immersion, contact and spray coating techniques may also be employed.

For example, contact and spray methods in which the glass structures pass into contact with an applicator member containing the treating material or through a spray, mist or bath of the material may also be employed. A specific example of such a treating method comprises flowing or trickling the treating solution down an inclined plane or chute and concurrently rolling the marbles or glass structures down the solution covered chute surface, whereby the solution is transferred to the surfaces of the glass structures. Alternatively, contact applicators, such as wicks or porous pads may be positioned adjacent to the path of the glass structures along an inclined chute or horizontal conveyor and in contact with the glass structures. Similarly, spray, jet or mist apparatus may be positioned upon or adjacent to the inclined or horizontal conveyors.

The coating or treating step may be followed by a drying step which may be achieved either through standing at room temperature or by means of applied heat such as oven heating or exposure to a burner flame.

As previously mentioned, the marbles treated according to the example were then utilized in the formation of glass filaments or fibers by the aforedescribed conventional fiber-forming method in order to ascertain the fiber-forming efficiency or "call down" rate data which is described hereafter. The fibers were formed by a method similar to that disclosed by U.S. 2,482,071 and 2,883,798.

The improvement achieved by means of the methods and materials of the present invention is aptly demonstrated by the "call down" data derived. "Call down" rates are indicia of production efficiency and are obtained by dividing the number of total interruptions, both voluntary and involuntary, which are experienced during a three hour period, into the number of voluntary interruptions occasioned by the tube running its full allotted course to completion and thereby requiring the commencement of a new tube.

The fiber-forming bushing into which the marbles treated according to the example were fed had previously exhibited a call down rate of 20%. When the treated marbles, which comprised the same glass composition as the marbles employed in achieving the previous data, were utilized the call down rate was increased to 36.15% to demonstrate an 80% improvement in operating efficiency.

It must be noted that the call down figures do not represent the total improvement achieved by the present invention since fiber breaks occurring from causes other than those combatted by the invention are still embodied in the figures representing the call down percentage for the treated marbles. Thus, it is possible that a complete solution of the specified problem is achieved and that the failure to obtain a 100% call down rate is precluded only because of the incidence of fiber breaks occasioned by other factors. For example, breaks caused by the formation of zircon beads are commonly experienced. The difficulty of attaining a 100% call down rate is aptly demonstrated by the fact that the uninterrupted completion of one wound package normally requires a winding cycle of approximately 15 minutes with the optimum processing of four packages per hour. Accordingly, the occurrence of one fiber break results in a call down rate decrease of 20% for that hour, which must be redeemed by, and is reflected in, preceding or succeeding operating hours.

While the methods and materials of the invention are described primarily in relation to roughly spherical structures or marbles, it must be realized that they are broadly applicable to any preformed glass structure which is melted and employed as a molten source for fiber formation. For example, glass cullet may be similarly treated to enhance its devitrification properties, and utilized as a base material or composition for fiber formation. Similarly, glass plate, tubes, rods and the like are also susceptible to the treatment. In addition, glass structures employed in other fiber-forming techniques which do not employ a fiber-forming bushing may also be treated according to the invention. For example, in methods wherein glass rods are rendered molten and fibers are drawn therefrom by attenuation or subjection to a fluid blast or jet, a corresponding improvement may be attained by pretreating the rods with the methods and materials of the invention. It should also be realized that the treatments may be employed to enhance the fiberizing qualities of other vitrifiable materials such as other siliceous and mineral compositions.

It is apparent that novel treating methods, materials and superior performing glass structures for use in fiberization processes have been provided by the present invention.

It is also obvious that various changes, substitutions and alterations may be made in the treating materials, methods and products of the invention, without departing from the spirit of the invention as is defined by the following claims.

I claim:

1. A method for improving the fiber-forming characteristics of glass structures containing siliceous and non-siliceous constituents which are employed in fiberization methods wherein the glass structures are transformed to a molten state and attenuated to form filaments, comprising contacting the surfaces of said glass structures with an acidic medium capable of preferentially dissolving said non-siliceous constitutents of said glass structures.

2. A method as described in claim 1 in which said acidic medium is nitric acid.

3. A method as described in claim 1 in which said glass structures are spheres.

4. In a method for producing glass filaments which includes the steps of transforming vitrified structures containing both siliceous and non-siliceous constituents to a moltent state and attenuating the resultant molten mass to form filaments therefrom, the improvement comprising contacting the surfaces of said vitrified structures with an acidic medium capable of preferentially dissolving said non-siliceous constituents of said vitrified structures.

5. A method as described in claim 4 in which said acidic medium is nitric acid.

6. A method as described in claim 4 in which said glass structures are spheres.

7. A method for forming glass filaments comprising vitrifying glass forming materials comprising both siliceous and non-siliceous constituents to form a molten vitrified mass, forming glass structures from said molten vitrified mass, cooling said glass structures to a non-molten state, contacting the surfaces of said glass structures with an acidic medium capable of preferentially dissolving the non-siliceous constituents of said glass structures, transforming said glass structures to a molten state and attenuating glass filaments from the molten glass structures.

8. A method as described in claim 7 in which said glass structures are spheres.

References Cited in the file of this patent
UNITED STATES PATENTS

| | | |
|---|---|---|
| 2,300,736 | Slayter et al. | Nov. 3, 1942 |
| 2,337,460 | French | Dec. 21, 1943 |
| 2,338,463 | Skaupy et al. | Jan. 4, 1944 |
| 2,407,456 | Simison et al. | Sept. 10, 1946 |
| 2,455,719 | Weyl et al. | Dec. 7, 1948 |
| 2,461,841 | Nordberg | Feb. 15, 1949 |
| 2,622,016 | Gilstrap et al. | Dec. 16, 1952 |